United States Patent
Singh et al.

(10) Patent No.: US 10,018,251 B2
(45) Date of Patent: Jul. 10, 2018

(54) MULTI-SPEED DUAL CLUTCH TRANSMISSION

(71) Applicant: GM Global Technology Operations LLC, Detroit, MI (US)

(72) Inventors: Tejinder Singh, Commerce Township, MI (US); Daryl A. Wilton, Macomb, MI (US); Elizabeth I. Wooden, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 14/936,274

(22) Filed: Nov. 9, 2015

(65) Prior Publication Data

US 2017/0130805 A1    May 11, 2017

(51) Int. Cl.
| | |
|---|---|
| *F16H 3/08* | (2006.01) |
| *F16H 3/093* | (2006.01) |
| *F16D 21/04* | (2006.01) |
| *F16H 3/00* | (2006.01) |

(52) U.S. Cl.
CPC ............ *F16H 3/093* (2013.01); *F16D 21/04* (2013.01); *F16H 3/006* (2013.01); *F16H 2003/0826* (2013.01); *F16H 2003/0931* (2013.01); *F16H 2200/0056* (2013.01)

(58) Field of Classification Search
CPC ........... F16H 37/021; F16H 2003/0931; F16H 2003/007; F16H 2003/008
USPC ................................ 74/330, 331, 333, 340
See application file for complete search history.

(56) References Cited

U.S. PATENT DOCUMENTS

| | | |
|---|---|---|
| 7,610,825 B2 | 11/2009 | Hendrickson et al. |
| 7,703,346 B2 | 4/2010 | Hendrickson et al. |
| 7,752,934 B2 | 7/2010 | Singh et al. |
| 7,798,931 B2 | 9/2010 | Earhart |
| 7,837,589 B2 | 11/2010 | Earhart |
| 7,846,055 B2 | 12/2010 | Earhart |
| 7,886,626 B2 | 2/2011 | Bjorck et al. |
| 7,896,770 B2 | 3/2011 | Earhart et al. |
| 7,978,740 B1 | 7/2011 | Delfyett et al. |
| 8,038,564 B2 | 10/2011 | Earhart et al. |
| 8,056,429 B2 | 11/2011 | Singh et al. |
| 8,104,367 B2 | 1/2012 | Singh et al. |
| 8,117,932 B2 | 2/2012 | Bjorck et al. |
| 8,117,933 B2 | 2/2012 | Ross et al. |
| 8,191,441 B2 | 6/2012 | Holmes |
| 8,220,351 B2 | 7/2012 | Ross et al. |
| 8,220,352 B2 | 7/2012 | Ross et al. |

(Continued)

FOREIGN PATENT DOCUMENTS

| | | |
|---|---|---|
| KR | 20050061789 A | 6/2005 |
| KR | 20050066089 A | 6/2005 |

(Continued)

*Primary Examiner* — Ha Dinh Ho (57) ABSTRACT

A transmission is connectable to an input member and includes an output transfer gear, first and second transmission input shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

17 Claims, 3 Drawing Sheets

(56) References Cited

U.S. PATENT DOCUMENTS

| | | |
|---|---|---|
| 8,240,224 B2 | 8/2012 | Mellet et al. |
| 8,255,129 B2 | 8/2012 | Mitchell et al. |
| 8,266,977 B2 | 9/2012 | Mohlin et al. |
| 8,286,552 B2 | 10/2012 | Niswonger |
| 8,297,140 B2 | 10/2012 | Ross et al. |
| 8,302,500 B2 | 11/2012 | Ross et al. |
| 8,327,730 B2 | 12/2012 | Mellet et al. |
| 8,333,127 B2 | 12/2012 | Singh et al. |
| 8,336,410 B2 | 12/2012 | Ross et al. |
| 8,336,411 B2 | 12/2012 | Ross et al. |
| 8,375,817 B2 | 2/2013 | Ross et al. |
| 8,408,085 B2 | 4/2013 | Sowul |
| 8,424,404 B2 | 4/2013 | Ross et al. |
| 8,434,380 B2 | 5/2013 | Ross |
| 8,438,941 B2 | 5/2013 | Mellet et al. |
| 8,443,686 B2 | 5/2013 | Singh et al. |
| 8,459,135 B2 | 6/2013 | Singh et al. |
| 8,464,599 B2 | 6/2013 | Ross et al. |
| 8,479,602 B2 | 7/2013 | Mohlin et al. |
| 8,485,056 B2 | 7/2013 | Ross |
| 8,495,926 B2 | 7/2013 | Mellet et al. |
| 8,499,656 B2 | 8/2013 | Ross et al. |
| 8,505,400 B2 | 8/2013 | Mellet et al. |
| 8,505,401 B2 | 8/2013 | Singh et al. |
| 8,511,189 B2 | 8/2013 | Ross et al. |
| 8,528,431 B2 | 9/2013 | Ross et al. |
| 8,534,150 B2 | 9/2013 | Mellet et al. |
| 8,573,084 B2 | 11/2013 | Ross et al. |
| 8,602,060 B2 | 12/2013 | Olson et al. |
| 8,635,924 B2 | 1/2014 | Singh et al. |
| 8,668,616 B2 | 3/2014 | Robinette |
| 8,733,194 B2 | 5/2014 | Mellet et al. |
| 8,739,644 B2 | 6/2014 | Singh et al. |
| 8,757,019 B2 | 6/2014 | Singh et al. |
| 8,757,020 B2 | 6/2014 | Singh et al. |
| 8,757,021 B2 | 6/2014 | Singh et al. |
| 9,249,863 B2 | 2/2016 | Mellet et al. |
| 2005/0115344 A1 | 6/2005 | Kim et al. |
| 2005/0139035 A1 | 6/2005 | Lee et al. |
| 2006/0032320 A1 | 2/2006 | Seo |
| 2006/0266141 A1* | 11/2006 | Ogami ............... F16H 3/006 74/325 |
| 2006/0266144 A1* | 11/2006 | Schafer ............... F16H 3/006 74/340 |
| 2008/0047378 A1* | 2/2008 | Borgerson ............ F16H 3/006 74/331 |
| 2008/0081661 A1 | 4/2008 | Wolmuth |
| 2008/0098838 A1 | 5/2008 | Seo |
| 2009/0139355 A1 | 6/2009 | Cho |
| 2009/0203483 A1* | 8/2009 | Earhart ............... F16H 3/006 475/207 |
| 2012/0249128 A1 | 10/2012 | Zhou et al. |

FOREIGN PATENT DOCUMENTS

| | | |
|---|---|---|
| KR | 20050115639 A | 12/2005 |
| KR | 20060069757 A | 6/2006 |
| KR | 20060095238 A | 8/2006 |
| KR | 20070107525 A | 11/2007 |
| KR | 100802712 B1 | 2/2008 |
| KR | 20080011486 A | 2/2008 |
| KR | 20090019116 A | 2/2009 |
| KR | 20090021575 A | 3/2009 |
| KR | 20090095768 A | 9/2009 |
| KR | 20090117386 A | 11/2009 |
| KR | 20090126700 A | 12/2009 |
| KR | 20100004295 A | 1/2010 |
| KR | 20100007398 A | 1/2010 |
| KR | 20100062642 A | 6/2010 |
| KR | 20100064719 A | 6/2010 |
| KR | 20100064726 A | 6/2010 |
| KR | 20100088731 A | 8/2010 |

* cited by examiner

FIG. 1

| | 150 | 152 | 154 | 156 | 36 | 38 |
|---|---|---|---|---|---|---|
| REV | | | | X | | X |
| 1ST | X | | | | X | |
| 2ND | | | X | | | X |
| 3RD | | X | | | X | |
| 4TH | | | | X | | X |
| 5TH | | X | | | X | |
| 6TH | | | X | | | X |
| 7TH | X | | | | X | |

FIG. 5

MULTI-SPEED DUAL CLUTCH TRANSMISSION

TECHNICAL FIELD

The present disclosure relates to transmissions and more particularly to a compact, dual clutch multiple speed transmission having countershafts to establish seven or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission connectable to an input member and includes an output member, first and second transmission input shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In another embodiment of the present invention, a transmission is provided having a transmission housing, a dual clutch assembly, a first, second, third, and fourth gear sets, a first and second transmission input member, a first and second countershafts and four synchronizer assemblies. The selective engagement of the first and second clutches of the dual clutch assembly interconnects the dual clutch housing with at least one of the first and the second transmission input members and the selective engagement of at least one of the four synchronizer assemblies establishes at least one of a plurality of forward and reverse speed ratios.

In still another embodiment of the present invention, the dual clutch assembly has a first clutch, a second clutch and a clutch housing connectable to an engine output member. The clutch housing is rotationally supported within the transmission housing.

In still another embodiment of the present invention, the first gear set includes a first gear, a second gear, a third gear and an idler gear. The first gear is in mesh with the second gear and the second gear is in mesh with the idler gear and the idler gear is in mesh with the third gear. The second gear set includes a first gear in mesh with a second gear and a third gear. The third gear set includes a first gear in mesh with a second gear and a third gear. The fourth gear set includes a first gear in mesh with a second gear and a third gear in mesh with the second gear set.

In still another embodiment of the present invention, a first transmission input member is rotatably supported in the transmission housing. The first gear of the first gear set and the first gear of the second gear set are rotatably fixed for common rotation with the first transmission input member. The selective engagement of the first clutch of the dual clutch assembly transfers torque from the clutch housing to the first transmission input member.

In still another embodiment of the present invention, the second transmission input member is rotatably supported in the transmission housing. The first gear of the third gear set and the first gear of the fourth gear set are rotatably fixed for common rotation with the second transmission input member. The second transmission input member is concentric with the first transmission input member and at least partially overlays the first transmission input member. The selective engagement of the second clutch of the dual clutch assembly transfers torque from the clutch housing to the second transmission input member.

In still another embodiment of the present invention, a first countershaft is rotatably supported within the transmission housing and spaced apart from and parallel with the first and second transmission input members. The second gear of the first gear set, the second gear of the second gear set, the second gear of the third gear set, the second gear of the fourth gear set are selectively connectable for common rotation with the first countershaft.

In still another embodiment of the present invention, the second countershaft is rotatably supported within the transmission housing and spaced apart from and parallel with the first and second transmission input members. The third gear of the first gear set, the third gear of the second gear set, the third gear of the third gear set, the third gear of the fourth gear set are each selectively connectable for common rotation with the second countershaft In still another embodiment of the present invention, the first countershaft transfer gear is rotatable fixed to the first countershaft for common rotation with the first countershaft.

In still another embodiment of the present invention, the second countershaft transfer gear is rotatable fixed to the second countershaft for common rotation with the second countershaft and the first and second countershaft transfer gears transfer torque to a transmission output member.

In yet another embodiment of the present invention, the four synchronizer assemblies selectively couple at least one of gears of the four gear sets with at least one of the first and second countershafts.

In yet another embodiment of the present invention, the selective engagement of the first and second clutches of the dual clutch assembly interconnects the dual clutch housing with at least one of the first and the second transmission input members and the selective engagement of at least one of the four synchronizer assemblies establishes at least one of a plurality of forward and reverse speed ratios.

In yet another embodiment of the present invention, a first of the four synchronizer assemblies selectively connects the first gear of the first gear set and the first gear of the second gear set to the first countershaft.

In yet another embodiment of the present invention, a second of the four synchronizer assemblies selectively connects the third gear of the first gear set and the third gear of the second gear set to the second countershaft.

In yet another embodiment of the present invention, a third of the four synchronizer assemblies selectively connects the first gear of the third gear set and the first gear of the fourth gear set to the first countershaft.

In yet another embodiment of the present invention, a fourth of the four synchronizer assemblies selectively connects the third gear of the third gear set and the third gear of the fourth gear set to the second countershaft.

In yet another embodiment of the present invention, the fourth gear set further comprises a fourth gear in mesh with the third gear of the fourth gear set.

In yet another embodiment of the present invention, a third countershaft is rotatably supported within the transmission housing and spaced apart from and parallel with the first and second transmission input members and the fourth gear of the fourth gear set is selectively connectable for common rotation with the third countershaft.

In yet another embodiment of the present invention, a third countershaft transfer gear rotatable fixed to the third countershaft for common rotation with the third countershaft and the third countershaft transfer gear is in mesh with the transmission output member.

In yet another embodiment of the present invention, a fifth synchronizer assembly is provided for selectively connecting the fourth gear of the fourth gear set to third countershaft.

In yet another embodiment of the present invention, the second gear set further comprises a fourth gear in mesh with an idler gear and the idler gear is in mesh with the third gear of the second gear set.

In yet another embodiment of the present invention, a third countershaft is rotatably supported within the transmission housing and spaced apart from and parallel with the first and second transmission input members, and the fourth gear of the second gear set is selectively connectable for common rotation with the third countershaft.

In yet another embodiment of the present invention, a fifth synchronizer assembly is provided for selectively connecting the fourth gear of the second gear set to third countershaft.

In yet another embodiment of the present invention, the second gear set further comprises a fourth gear in mesh with an idler gear and wherein the idler gear is in mesh with the third gear of the second gear set.

In yet another embodiment of the present invention, a third countershaft is rotatably supported within the transmission housing and spaced apart from and parallel with the first and second transmission input members, and the fourth gear of the second gear set is selectively connectable for common rotation with the third countershaft.

In yet another embodiment of the present invention, a fifth synchronizer assembly for selectively connecting the fourth gear of the second gear set to third countershaft.

In yet another embodiment of the present invention, a third countershaft transfer gear rotatable fixed to the third countershaft for common rotation with the third countershaft, and the third countershaft transfer gear is in mesh with the transmission output member.

In yet another embodiment of the present invention, a fifth gear set where the fifth gear set includes a first gear fixed to second transmission input member, a second gear in mesh with the first gear and a third gear in mesh with the first gear.

In yet another embodiment of the present invention, the second gear of the fourth gear set is selectively connectable to the second countershaft.

In yet another embodiment of the present invention, the third gear of the fourth gear set is selectively connectable to the third countershaft In yet another embodiment of the present invention, the transmission output member is a gear that meshes with the each of the first and second countershaft transfer gears.

In yet another embodiment of the present invention, the fourth gear set is adjacent the dual clutch assembly, the third gear set is adjacent the fourth gear set, the second gear set is adjacent the third gear set and the first gear set is disposed between the second gear set and an end wall of the transmission housing.

The above features and advantages and other features and advantages of the present invention are readily apparent from the following detailed description of the best modes for carrying out the invention when taken in connection with the accompanying drawings wherein like reference numbers refer to the same component, element or feature.

DESCRIPTION

Figure 1:
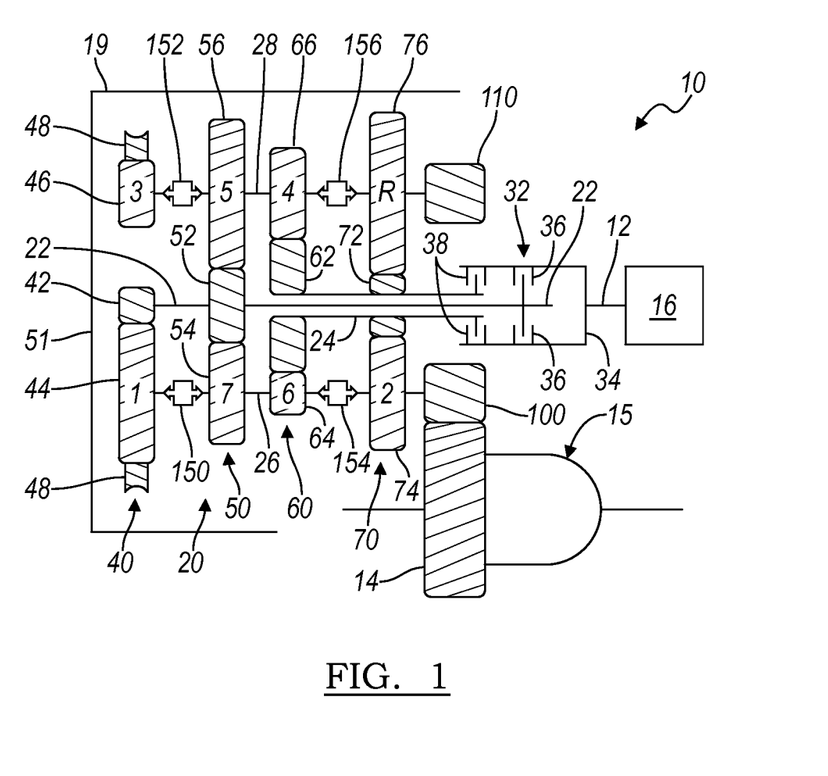
FIG. 1 is a schematic view of an embodiment of a seven speed transmission having a dual clutch, two transmission input shafts, two countershafts, a plurality of gear sets and a plurality of synchronizers, in accordance with the present invention.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly 15. The differential assembly transfers torque delivered by output member 14, ultimately, to road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26 and a second countershaft 28. The second transmission input shaft or member 24 is a hollow shaft that is concentric with and at least partially overlies the first transmission input shaft or member 22. The first countershaft 26 and the second countershaft 28 are each spaced apart from and parallel with the first and second transmission input shaft members 22, 24. The first and second transmission input shafts 22, 24 define a first axis of rotation, the first countershaft 26 defines a second axis of rotation and the second countershaft 28 defines a third axis of rotation. The position and location of countershafts 26 and 28 relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is selectively connectable for common rotation with the first transmission input shaft or member 22 and the clutch element 38 is selectively connectable for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that the dual clutch assembly 32 shown throughout the Figures may be a wet or dry clutch assembly without departing from the scope of the present invention.

The gearing arrangement 20 also includes a plurality of co-planar, meshing gear sets 40, 50, 60 and 70. The present invention contemplates that the plurality of co-planar, meshing gear sets 40, 50, 60 and 70 may be arranged axially along transmission input shafts 22, 24 in an order other than that which is shown in FIG. 1 and still be within the scope of the invention. Co-planar gear set 40 includes a first pinion gear 42, a second pinion gear 44 a third pinion gear 46 and an idler gear 48. First pinion gear 42 is rotatably fixed and connected for common rotation with the transmission input shaft 22. Second pinion gear 44 is freely rotatable about the first countershaft 26 and meshes with first pinion gear 42. Second pinion gear 44 is freely rotatable about the first countershaft 26 and meshes with the idler gear 48. Third pinion gear 46 is freely rotatable about the second countershaft 28 and meshes with idler gear 48. It should be appreciated that first pinion gear 42 may be a separate gear structure fixed to the transmission input shaft 22 or gear teeth/splines formed on an outer surface of the transmission input shaft 22 without departing from the scope of the present invention. Likewise, it should also be appreciated that second pinion gear 44 may be a separate gear structure fixed to the first countershaft 26 or gear teeth/splines formed on an outer surface of the first countershaft 26 without departing from the scope of the present invention. Similarly, it should be appreciated that third pinion gear 46 may be a separate gear structure fixed to the second countershaft 28 or gear teeth/splines formed on an outer surface of the second countershaft 28 without departing from the scope of the present invention. Gear set 40 is disposed adjacent a wall 51 of the transmission housing 19 on the opposite side of the transmission relative to the dual clutch assembly 32.

Co-planar gear set 50 includes a first pinion gear 52, a second pinion gear 54 and a third pinion gear 56. First pinion gear 52 is rotatably fixed and connected for common rotation with the first transmission input shaft member 22 and meshes with the second pinion gear 54 and the third pinion gear 56. Second pinion gear 54 is freely rotatable about the first countershaft 26. Third pinion gear 56 is freely rotatable about the second countershaft 28. Gear set 50 is positioned axially adjacent gear set 40.

Co-planar gear set 60 includes a first pinion gear 62, a second pinion gear 64 and a third pinion gear 66. First pinion gear 62 is rotatably fixed and connected for common rotation with the second transmission input shaft member 24 and meshes with the second pinion gear 64 and the third pinion gear 66. Second pinion gear 64 is freely rotatable about the first countershaft 26. Third pinion gear 66 is freely rotatable about the second countershaft 28. Gear set 60 is disposed adjacent gear set 50.

Co-planar gear set 70 includes a first pinion gear 72, a second pinion gear 74 and a third pinion gear 76. First pinion gear 72 is rotatably fixed and connected for common rotation with the second transmission input shaft member 24 and meshes with the second pinion gear 74. The second pinion gear 74 is freely rotatable about the first countershaft 26. The third pinion gear 76 is freely rotatable about the second countershaft 28. Gear set 70 is positioned adjacent gear set 60.

Further, a first countershaft transfer gear 100 is fixedly connected for common rotation with the first countershaft member 26. A second countershaft transfer gear 110 is fixedly connected for common rotation with the second countershaft member 28. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other.

A park gear (not shown) may be provided for placing transmission 10 in a park mode that prevents output member 14 from rotating. The park gear may be rotationally fixed to the first or second countershaft members 26 and 28. However, the axial location of the park gear along the first or second countershaft members 26 or 28 may be altered in accordance with available packaging space.

With continued reference to FIG. 1, the transmission 10 further includes a plurality of selectively engageable synchronizer assemblies 150, 152, 154 and 156. Synchronizers 150, 152, 154 and 156 and are double sided synchronizers and generally include a shift fork (not shown) that is bi-directionally translated by an actuator (not shown) into at least two engaged positions and a neutral or disengaged position. In the present embodiment, synchronizer 150 is selectively actuatable to selectively connect the second pinion gear 44 and the second pinion gear 54 for common rotation with the first countershaft member 26. Synchronizer 152 is selectively actuatable to selectively connect for common rotation the third pinion gear 46 and the third pinion gear 56 with the second countershaft member 28. Synchronizer 154 is selectively actuatable to selectively connect for common rotation the second pinion gear 64 and the second pinion gear 74 with the first countershaft member 26. Synchronizer 156 is selectively actuatable to selectively connect for common rotation the third pinion gear 66 and the third pinion gear 76 with the second countershaft member 28.

The transmission 10 is capable of transmitting torque from the input shaft 12 to the output gear member 14 in at least seven forward torque ratios and at least one reverse torque ratio. Each of the forward torque ratios and the reverse torque ratio is attained by selective engagement of the dual clutch assembly 32 and one or more of the synchronizer assemblies 150, 152, 154 and 156. Those skilled in the art will readily understand that a different speed ratio is associated with each torque ratio.

It should also be appreciated that each individual gear set or combinations of gear sets 40, 50, 60 and 70 provides one or more forward and/or reverse gear ratios upon selective engagement of the synchronizer assemblies 150, 152, 154 and 156. Moreover, it should be appreciated that a particular forward or reverse speed ratio may be achieved by different combinations of synchronizer and associated gear sets without departing from the scope of the present invention.

Figure 2:
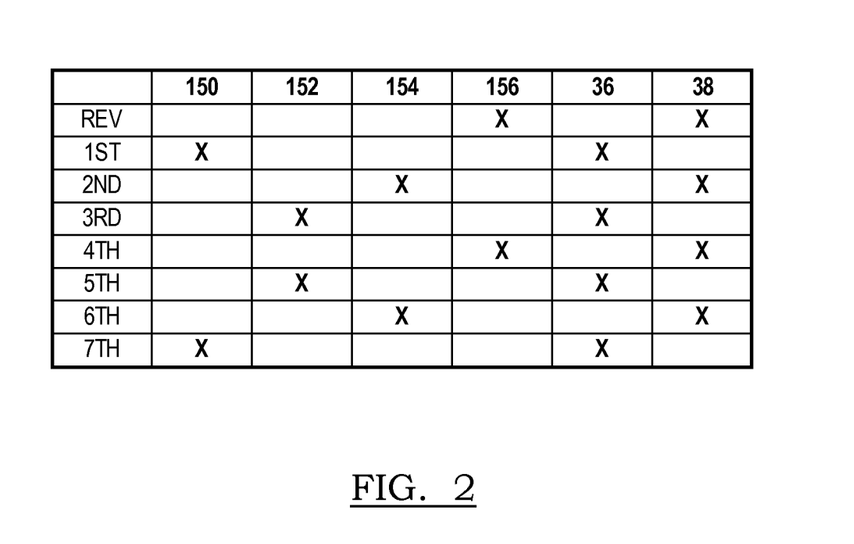
FIG. 2 is a clutch table illustrating the state of engagement of the dual clutch and each of the plurality of synchronizers for each of the seven forward gear ratios and one reverse gear ratio, in accordance with the present invention.

Referring now to FIG. 2, a truth table or clutching chart illustrates the state of engagement for the dual clutch 32 and the synchronizers 150, 152, 154 and 156. An "X" in the box means that the particular clutch and/or synchronizer are engaged to achieve the desired gear state. Actual numerical gear ratios of the various gear states are not shown although it should be appreciated that the gear ratios may be adjusted over significant ranges to accommodate various applications and operational criteria of the transmission. Of course, other gear ratios are achievable depending on the gear diameter, gear teeth count and gear configuration selected.

For example, to establish the reverse torque ratio, clutch element 38 is engaged and synchronizer 156 is activated. Clutch element 38 couples the input member 12 with the second transmission input shaft member 24. Synchronizer 156 connects the third pinion 76 of gear set 70 with the second countershaft member 28. More specifically, input torque from the input shaft 12 is transferred through the dual clutch assembly 32 to the second transmission input shaft member 24, from transmission input shaft member 24 to gear 72, from gear 72 to gear 74, from gear 74 to gear 76, from gear 76 to synchronizer 156, from synchronizer 156 to second countershaft member 28, from second countershaft member 28 to second countershaft transfer gear 110 and from second countershaft transfer gear 110 to the output member 14.

To establish a first forward torque ratio (i.e. a 1st gear), clutch element 36 is engaged and synchronizer 150 activated. Clutch element 36 couples the input member 12 with the first transmission input shaft member 22. Synchronizer 150 connects the second pinion 44 of the first gear set 40 to the first countershaft member 26. More specifically, input torque from the input shaft 12 is transferred through the dual clutch assembly 32 to the first transmission input shaft member 22, from transmission input shaft member 22 to gear 42, from gear 42 to gear 44, from gear 44 to synchronizer 150, from synchronizer 150 to first countershaft member 26, from first countershaft member 26 to first countershaft transfer gear 100 and from first countershaft transfer gear 100 to the output member 14.

To establish a second forward torque ratio (i.e. a 2nd gear), clutch element 38 is engaged and synchronizer 154 is activated. Clutch element 38 couples the input member 12 with the second transmission input shaft member 24. Synchronizer 154 connects the second gear 74 of gear set 70 to first countershaft member 26. More specifically, input torque from the input shaft 12 is transferred through the dual clutch assembly 32 to the second transmission input shaft member 24 to gear 72, from gear 72 to gear 74, from gear 74 to synchronizer 154, from synchronizer 154 to first countershaft member 26, from first countershaft member 26 to first countershaft transfer gear 100 and from first countershaft transfer gear 100 to the output member 14.

To establish a third forward torque ratio (i.e. a 3rd gear), clutch element 36 is engaged and synchronizer 152 is activated. Clutch element 36 couples the input member 12 to the first transmission input shaft member 22 which rotates pinion 42. Synchronizer 152 connects the third gear 46 of gear set 40 the second countershaft member 28. More specifically, input torque from the input shaft 12 is transferred through the dual clutch assembly 32 to the first transmission input shaft member 22 to gear 42, from gear 42 to gear 44, from gear 44 to idler gear 48, from idler gear 48 to gear 46, from gear 46 to synchronizer 152, from synchronizer 152 to second countershaft member 28, from second countershaft member 28 to second countershaft transfer gear 110 and from second countershaft transfer gear 110 to the output member 14.

To establish a fourth forward torque ratio (i.e. a 4th gear), clutch element 38 is engaged and synchronizers 156 are activated. Clutch element 38 couples the input member 12 with the second transmission input shaft member 24. Synchronizer 156 connects the third gear 66 of gear set 60 second countershaft member 28. More specifically, input torque from the input shaft 12 is transferred through the dual clutch assembly 32 to the second transmission input shaft member 24 to gear 62, from gear 62 to gear 66, from gear 66 to synchronizer 156, from synchronizer 156 to second countershaft member 28, from second countershaft member 28 to second countershaft transfer gear 110 and from second countershaft transfer gear 110 to the output member 14.

To establish a fifth forward torque ratio (i.e. a 5th gear), clutch element 36 is engaged and synchronizer 152 is activated. Clutch element 36 couples the input member 12 with the first transmission input shaft member 22. Synchronizer 152 connects the third pinion 56 of the second gear set 50 to the second countershaft member 28. More specifically, input torque from the input shaft 12 is transferred through the dual clutch assembly 32 to the first transmission input shaft member 22 and to gear 52, from gear 52 to gear 56, from gear 56 to synchronizer 152, from synchronizer 152 to the second countershaft member 28, from second countershaft member 28 to the second countershaft transfer gear 110 and from second countershaft transfer gear 110 to the output member 14.

To establish a sixth forward torque ratio (i.e. a 6th gear), clutch element 38 is engaged and synchronizer 154 is activated. Clutch element 38 couples the input member 12 with the second transmission input shaft member 24. Synchronizer 154 connects second pinion gear 64 of the third gear set 60 the first countershaft member 26. More specifically, input torque from the input shaft 12 is transferred through the dual clutch assembly 32 to the second transmission input shaft member 24 and to gear 62, from gear 62 to gear 64, from gear 64 to synchronizer 154, from synchronizer 154 to first countershaft member 26, from first countershaft member 26 to first countershaft transfer gear 100, from transfer gear 100 to the output member 14.

To establish a seventh forward torque ratio (i.e. a 7th gear), clutch element 36 is engaged and synchronizer 150 is activated. Clutch element 36 couples the input member 12 with the first transmission input shaft member 22. Synchronizer 150 connects second pinion gear 54 of the second gear set 50 the first countershaft member 26. More specifically, input torque from the input shaft 12 is transferred through the dual clutch assembly 32 to the first transmission input shaft member 22 and to gear 52, from gear 52 to gear 54, from gear 54 to synchronizer 150, from synchronizer 150 to first countershaft member 26, from first countershaft member 26 to first countershaft transfer gear 100, from transfer gear 100 to the output member 14.

Again, it should be appreciated that any one of the gear sets of gear sets 40, 50, 60 and 70 may be changed in size and number gear teeth or gear pitch to produce a certain forward and reverse torque ratio without departing from the scope of the present invention.

Figure 3:
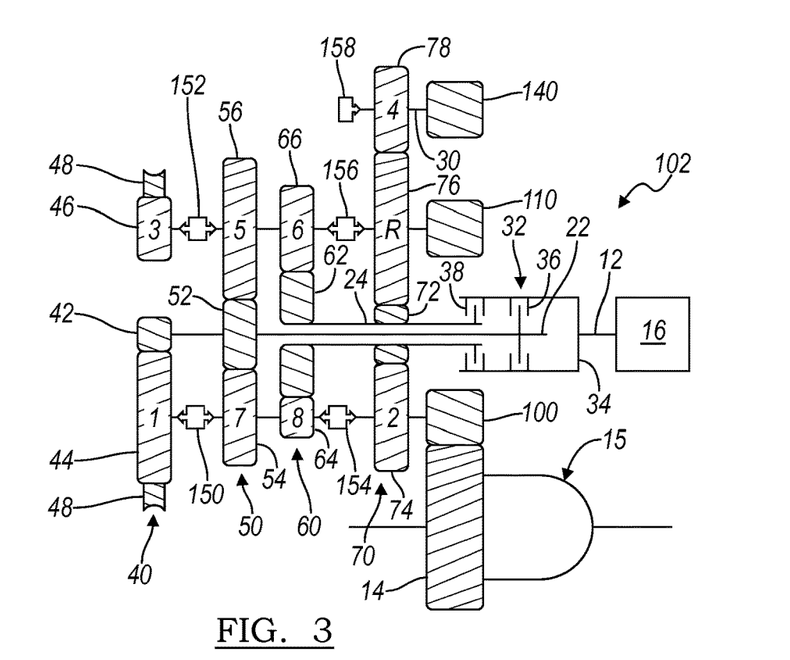
FIG. 3 is a schematic view of an embodiment of an eight speed transmission having a dual clutch, two transmission input shafts, three countershafts, a plurality of gear sets and a plurality of synchronizers, in accordance with the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, by adding a third countershaft 30, a fourth pinion gear 78 to gear set 70, an additional synchronizer 158 and a third countershaft transfer gear 140 to the seven speed transmission 10 of FIG. 1 a transmission 102 having eight forward speeds and one reverse speed is produced, as illustrated in FIG. 3. Fourth pinion gear 78 of gear set 70 is free to rotate about third countershaft 30 and is in mesh with third pinion gear 76. Third countershaft 30 is parallel to and spaced apart from countershafts 26 and 28 and first and second transmission input shaft members 22 and 24. Synchronizer 158 selectively connects the fourth gear 78 of gear set 70 to third countershaft member 30. Third countershaft transfer gear 140 is fixedly connected for common rotation with third countershaft 30. Moreover, third countershaft transfer gear 140 is in mesh with output member 14.

With continuing reference to FIG. 3, the eight speed dual clutch transmission 102 is illustrated, in accordance with the present invention. The eight speed transmission 102 has the same components as transmission 10 as described above and as indicated by like reference numbers depicting like components, as shown in FIG. 1. Gear ratios 1, 2, 3, 5, 7 and reverse in transmission 102 are attained as described above with respect to transmission 10. Gear ratios 4, 6 and 8 are achieved as follows. To establish a fourth forward torque ratio (i.e. a 4th gear), clutch element 38 is engaged and synchronizer 158 is activated. Clutch element 38 couples the input member 12 with the second transmission input shaft member 24. Synchronizer 158 connects the fourth gear 78 of gear set 70 to third countershaft member 30. More specifically, input torque from the input shaft 12 is transferred through the dual clutch assembly 32 to the second transmission input shaft member 24 to gear 72, from gear 72 to gear 74, from gear 74 to gear 76, from gear 76 to gear 78, from gear 78 to synchronizer 158, from synchronizer 158 to third countershaft member 30, from third countershaft member 30 to third countershaft transfer gear 120 and from third countershaft transfer gear 120 to the output member 14. To establish a sixth forward torque ratio (i.e. a 6th gear), clutch element 38 is engaged and synchronizer 156 is activated. Clutch element 38 couples the input member 12 with the second transmission input shaft member 24. Synchronizer 156 connects the third gear 66 of gear set 60 second countershaft member 28. More specifically, input torque from the input shaft 12 is transferred through the dual clutch assembly 32 to the second transmission input shaft member 24 to gear 62, from gear 62 to gear 66, from gear 66 to synchronizer 156, from synchronizer 156 to second countershaft member 28, from second countershaft member 28 to second countershaft transfer gear 110 and from second countershaft transfer gear 110 to the output member 14. To establish an eighth forward torque ratio (i.e. an 8th gear), clutch element 38 is engaged and synchronizer 154 is activated. Clutch element 38 couples the input member 12 with the second transmission input shaft member 24. Synchronizer 154 connects second pinion gear 64 of the third gear set 60 the first countershaft member 26. More specifically, input torque from the input shaft 12 is transferred through the dual clutch assembly 32 to the second transmission input shaft member 24 and to gear 62, from gear 62 to gear 64, from gear 64 to synchronizer 154, from synchronizer 154 to first countershaft member 26, from first countershaft member 26 to first countershaft transfer gear 100, from transfer gear 100 to the output member 14.

Figure 4:
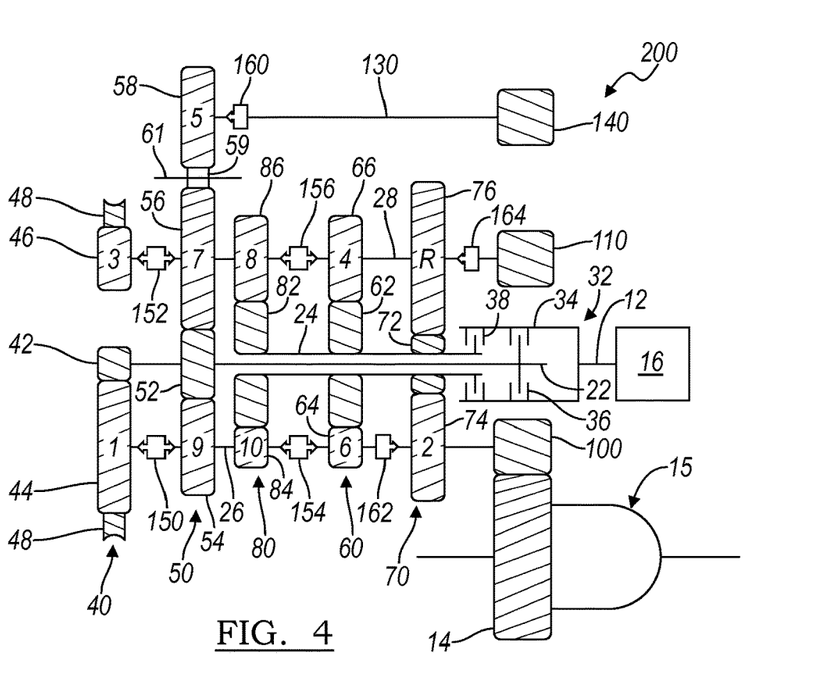
FIG. 4 is a schematic view of an embodiment of a ten speed transmission having a dual clutch, two transmission input shafts, three countershafts, a plurality of gear sets and a plurality of synchronizers, in accordance with the present invention.

Referring now to FIG. 4, a ten speed dual clutch transmission 200 is illustrated according to the principles of the invention. Ten speed transmission 200 has the same components as described above with respect to transmission 10 of FIG. 1 and as indicated by like reference numbers depicting like components. The ten speed transmission 200 is achieved by adding a third countershaft 130, a third countershaft transfer gear 140, a fourth pinion gear 58 to gear set 50, an idler gear 59, synchronizers 160, 162, 164 and fifth gear set 80 to the seven speed transmission 10 of FIG. 1. Third countershaft 130 is parallel to and spaced apart from countershafts 26 and 28 and first and second transmission input shaft members 22 and 24. Third countershaft transfer gear 140 is fixedly connected for common rotation with the third countershaft 130. Fourth pinion gear 58 of gear set 50 is free to rotate about third countershaft 130 and is in mesh with idler gear 59. Idler gear 59 which is supported and free to rotate about an idler shaft 61 is also in mesh with third pinion gear 56. Synchronizer 160 connects the third gear 58 of gear set 50 for common rotation with third countershaft member 130. Synchronizer 162 connects the second gear 74 of gear set 70 for common rotation with first countershaft member 26. Synchronizer 164 connects the second gear 76 of gear set 70 for common rotation with second countershaft member 28.

With continuing reference to FIG. 4, the operation of the ten speed transmission 200 will be described. Gear ratios 1, 2, 3, 4, 6 and reverse in transmission 200 are attained as described above with respect to transmission 10 and shown in FIG. 2. Gear ratios 5, 7, 8, 9 and 10 are achieved as follows. To establish a fifth forward torque ratio (i.e. a 5th gear), clutch element 36 is engaged and synchronizer 160 is activated. Clutch element 36 couples the input member 12 with the first transmission input shaft member 22. Synchronizer 160 connects the fourth gear 58 of gear set 50 to third countershaft member 130. More specifically, input torque from the input shaft 12 is transferred through the dual clutch assembly 32 to the first transmission input shaft member 22 to gear 52, from gear 52 to gear 56, from gear 56 to idler gear 59, from idler gear 59 to gear 58, from gear 58 to synchronizer 160, from synchronizer 160 to third countershaft member 130, from third countershaft member 130 to third countershaft transfer gear 140 and from third countershaft transfer gear 140 to the output member 14. To establish a seventh forward torque ratio (i.e. a 7th gear), clutch element 36 is engaged and synchronizer 152 is activated. Clutch element 36 couples the input member 12 with the first transmission input shaft member 22. Synchronizer 152 connects the third gear 56 of gear set 50 to second countershaft member 28. More specifically, input torque from the input shaft 12 is transferred through the dual clutch assembly 32 to the first transmission input shaft member 22 to gear 52, from gear 52 to gear 56, from gear 56 to synchronizer 152, from synchronizer 152 to second countershaft member 28, from second countershaft member 28 to second countershaft transfer gear 110 and from second countershaft transfer gear 110 to the output member 14. To establish an eighth forward torque ratio (i.e. an 8th gear), clutch element 38 is engaged and synchronizer 156 is activated. Clutch element 38 couples the input member 12 with the second transmission input shaft member 24. Synchronizer 156 connects third pinion gear 86 of the fifth gear set 80 to the second countershaft member 28. More specifically, input torque from the input shaft 12 is transferred through the dual clutch assembly 32 to the second transmission input shaft member 24 and to gear 82, from gear 82 to gear 86, from gear 86 to synchronizer 156, from synchronizer 156 to second countershaft member 28, from second countershaft member 28 to second countershaft transfer gear 110, from transfer gear 110 to the output member 14. To establish a ninth forward torque ratio (i.e. a 9th gear), clutch element 36 is engaged and synchronizer 150 is activated. Clutch element 36 couples the input member 12 with the first transmission input shaft member 22. Synchronizer 150 connects the second gear 54 of gear set 50 to first countershaft member 26. More specifically, input torque from the input shaft 12 is transferred through the dual clutch assembly 32 to the first transmission input shaft member 22 to gear 52, from gear 52 to gear 54, from gear 54 to synchronizer 150, from synchronizer 150 to first countershaft member 26, from first countershaft member 26 to first countershaft transfer gear 100 and from first countershaft transfer gear 100 to the output member 14. To establish a tenth forward torque ratio (i.e. a 10th gear), clutch element 38 is engaged and synchronizer 154 is activated. Clutch element 38 couples the input member 12 with the second transmission input shaft member 24. Synchronizer 154 connects second pinion gear 84 of the fifth gear set 80 to the first countershaft member 26. More specifically, input torque from the input shaft 12 is transferred through the dual clutch assembly 32 to the second transmission input shaft member 24 and to gear 82, from gear 82 to gear 84, from gear 84 to synchronizer 154, from synchronizer 154 to first countershaft member 26, from first countershaft member 26 to first countershaft transfer gear 100, from transfer gear 100 to the output member 14.

Figure 5:
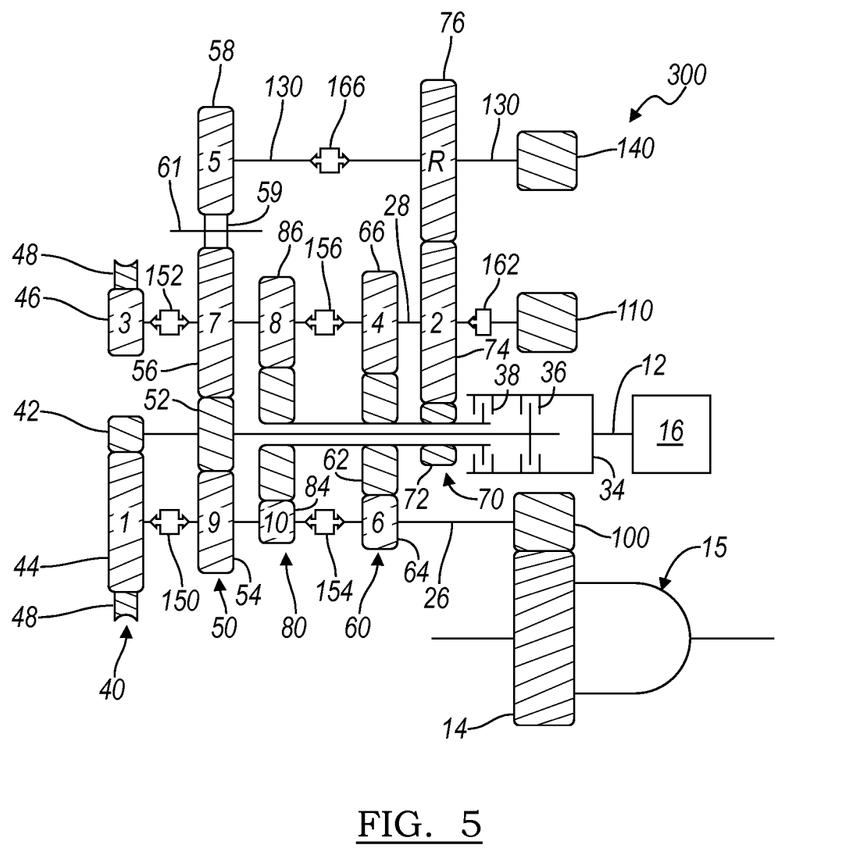
FIG. 5 is a schematic view of another embodiment of a ten speed transmission having a dual clutch, two transmission input shafts, three countershafts, a plurality of gear sets and a plurality of synchronizers, in accordance with the present invention.

Referring now to FIG. 5, an alternate arrangement for a ten speed dual clutch transmission 300 is illustrated according to the principles of the invention. Ten speed transmission 300 has the same components as described above with respect to transmission 200 of FIG. 4 and as indicated by like reference numbers depicting like components. However, transmission 300 has a different gear set arrangement for gear set 70. Gear set 70 is comprised of three gears: a first pinion gear 72, a second pinion gear 74 and a third pinion gear 76. In the present embodiment, first pinion gear 72 is fixedly attached for common rotation with second transmission input shaft 24 and meshes with the second pinion gear 74 as in transmission 200. The second pinion gear 74 is freely rotatable about the second countershaft 28. The third pinion gear 76 is freely rotatable about the third countershaft 130 and meshes with the second pinion gear 74. A synchronizer 166 replaces synchronizer 160 in transmission 200. Synchronizer 166 is a double-sided synchronizer that is selectively actuatable to selectively connect for common rotation the fourth pinion gear 58 and the third pinion gear 76 with the third countershaft member 130. Synchronizer 162 in the present embodiment now is selectively actuatable to selectively connect for common rotation the second pinion gear 74 with the second countershaft member 28. In the present embodiment, a reverse torque ratio is established by engaging clutch element 38 and activating synchronizer 166. Clutch element 38 couples the input member 12 with the second transmission input shaft member 24. Synchronizer 166 connects the third pinion 76 of gear set 70 with the third countershaft member 130. More specifically, input torque from the input shaft 12 is transferred through the dual clutch assembly 32 to the second transmission input shaft member 24, from transmission input shaft member 24 to gear 72, from gear 72 to gear 74, from gear 74 to gear 76, from gear 76 to synchronizer 166, from synchronizer 166 to third countershaft member 130, from third countershaft member 130 to third countershaft transfer gear 140 and from third countershaft transfer gear 140 to the output member 14. To establish a second forward torque ratio (i.e. a 2nd gear), clutch element 38 is engaged and synchronizer 162 is activated. Clutch element 38 couples the input member 12 with the second transmission input shaft member 24. Synchronizer 162 connects the second gear 74 of gear set 70 to second countershaft member 28. More specifically, input torque from the input shaft 12 is transferred through the dual clutch assembly 32 to the second transmission input shaft member 24 to gear 72, from gear 72 to gear 74, from gear 74 to synchronizer 162, from synchronizer 162 to second countershaft member 28, from second countershaft member 28 to second countershaft transfer gear 110 and from second countershaft transfer gear 110 to the output member 14. The remaining forward gears are established as described above with respect to transmission 200 as shown in FIG. 4.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a transmission housing;
   a dual clutch assembly having a first clutch, a second clutch and a clutch housing connectable to an engine output member, wherein the clutch housing is rotationally supported within the transmission housing;
   a first, second, third and fourth gear set, wherein the first gear set includes a first gear, a second gear, a third gear and an idler gear, wherein the first gear is in mesh with the second gear and the second gear is in mesh with the idler gear and the idler gear is in mesh with the third gear, the second gear set includes a first gear in mesh with a second gear and a third gear, the third gear set includes a first gear in mesh with a second gear and a third gear, the fourth gear set includes a first gear in mesh with a second gear and a third gear in mesh with the second gear set;
   a first transmission input member rotatably supported in the transmission housing and wherein the first gear of the first gear set and the first gear of the second gear set are rotatably fixed for common rotation with the first transmission input member and wherein the selective engagement of the first clutch of the dual clutch assembly transfers torque from the clutch housing to the first transmission input member;
   a second transmission input member rotatably supported in the transmission housing and wherein the first gear of the third gear set and the first gear of the fourth gear set are rotatably fixed for common rotation with the second transmission input member and wherein the second transmission input member is concentric with the first transmission input member and at least partially overlays the first transmission input member and wherein the selective engagement of the second clutch of the dual clutch assembly transfers torque from the clutch housing to the second transmission input member;

a first countershaft rotatably supported within the transmission housing and spaced apart from and parallel with the first and second transmission input members, wherein the second gear of the first gear set, the second gear of the second gear set, the second gear of the third gear set, the second gear of the fourth gear set are selectively connectable for common rotation with the first countershaft;

a second countershaft rotatably supported within the transmission housing and spaced apart from and parallel with the first and second transmission input members, wherein the third gear of the first gear set, the third gear of the second gear set, the third gear of the third gear set, the third gear of the fourth gear set are each selectively connectable for common rotation with the second countershaft;

a first countershaft transfer gear rotatable fixed to the first countershaft for common rotation with the first countershaft;

a second countershaft transfer gear rotatable fixed to the second countershaft for common rotation with the second countershaft wherein the first and second countershaft transfer gears transfer torque to a transmission output member;

four synchronizer assemblies for selectively coupling at least one of gears of the four gear sets with at least one of the first and second countershafts, and wherein the selective engagement of the first and second clutches of the dual clutch assembly interconnects the dual clutch housing with at least one of the first and the second transmission input members and the selective engagement of at least one of the four synchronizer assemblies establishes at least one of a plurality of forward and reverse speed ratios.

2. The transmission of claim 1 wherein a first of the four synchronizer assemblies selectively connects the first gear of the first gear set and the first gear of the second gear set to the first countershaft.

3. The transmission of claim 2 wherein a second of the four synchronizer assemblies selectively connects the third gear of the first gear set and the third gear of the second gear set to the second countershaft.

4. The transmission of claim 3 wherein a third of the four synchronizer assemblies selectively connects the first gear of the third gear set and the first gear of the fourth gear set to the first countershaft.

5. The transmission of claim 4 wherein a fourth of the four synchronizer assemblies selectively connects the third gear of the third gear set and the third gear of the fourth gear set to the second countershaft.

6. The transmission of claim 1 wherein the fourth gear set further comprises a fourth gear in mesh with the third gear of the fourth gear set.

7. The transmission of claim 6 further comprising a third countershaft rotatably supported within the transmission housing and spaced apart from and parallel with the first and second transmission input members, wherein the fourth gear of the fourth gear set is selectively connectable for common rotation with the third countershaft.

8. The transmission of claim 7 further comprising a third countershaft transfer gear rotatable fixed to the third countershaft for common rotation with the third countershaft, wherein the third countershaft transfer gear is in mesh with the transmission output member.

9. The transmission of claim 8 further comprising a fifth synchronizer assembly for selectively connecting the fourth gear of the fourth gear set to third countershaft.

10. The transmission of claim 1 wherein the second gear set further comprises a fourth gear in mesh with a second idler gear and wherein the second idler gear is in mesh with the third gear of the second gear set.

11. The transmission of claim 10 further comprising a third countershaft rotatably supported within the transmission housing and spaced apart from and parallel with the first and second transmission input members, wherein the fourth gear of the second gear set is selectively connectable for common rotation with the third countershaft.

12. The transmission of claim 11 further comprising a fifth synchronizer assembly for selectively connecting the fourth gear of the second gear set to third countershaft.

13. The transmission of claim 12 further comprising a third countershaft transfer gear rotatable fixed to the third countershaft for common rotation with the third countershaft, wherein the third countershaft transfer gear is in mesh with the transmission output member.

14. The transmission of claim 13 further comprising a fifth gear set wherein the fifth gear set includes a first gear fixed to second transmission input member, a second gear in mesh with the first gear and a third gear in mesh with the first gear.

15. The transmission of claim 1 wherein the transmission output member is a gear that meshes with the each of the first and second countershaft transfer gears.

16. The transmission of claim 1 wherein the fourth gear set is adjacent the dual clutch assembly, the third gear set is adjacent the fourth gear set, the second gear set is adjacent the third gear set and the first gear set is disposed between the second gear set and an end wall of the transmission housing.

17. A transmission comprising:
a transmission housing;
a dual clutch assembly having a first clutch, a second clutch and a clutch housing connectable to an engine output member, wherein the clutch housing is rotationally supported within the transmission housing;
a first, second, third, fourth and fifth gear set, wherein the first gear set includes a first gear, a second gear, a third gear and an idler gear, wherein the first gear is in mesh with the second gear and the second gear is in mesh with the idler gear and the idler gear is in mesh with the third gear, the second gear set includes a first gear in mesh with a second gear and a third gear and a fourth gear in mesh with an idler gear wherein the idler gear is in mesh with the third gear, the third gear set includes a first gear in mesh with a second gear and a third gear, the fourth gear set includes a first gear in mesh with a second gear and a third gear in mesh with the second gear set, and the fifth gear set includes a first gear in mesh with a second gear and a third gear;
a first transmission input member rotatably supported in the transmission housing and wherein the first gear of the first gear set and the first gear of the second gear set are rotatably fixed for common rotation with the first transmission input member and wherein the selective engagement of the first clutch of the dual clutch assembly transfers torque from the clutch housing to the first transmission input member;
a second transmission input member rotatably supported in the transmission housing and wherein the first gear of the third gear set, the first gear of the fourth gear set and the first gear of the fifth gear set are rotatably fixed for common rotation with the second transmission input member and wherein the second transmission input member is concentric with the first transmission input member and at least partially overlays the first transmission input member and wherein the selective engagement of the second clutch of the dual clutch assembly transfers torque form the clutch housing to the second transmission input member;

a first countershaft rotatably supported within the transmission housing and spaced apart from and parallel with the first and second transmission input members, wherein the second gear of the first gear set, the second gear of the second gear set, the second gear of the third gear set, the second gear of the fourth gear set and the second gear of the fifth gear set are selectively connectable for common rotation with the first countershaft;

a second countershaft rotatably supported within the transmission housing and spaced apart from and parallel with the first and second transmission input members, wherein the third gear of the first gear set, the third gear of the second gear set, the third gear of the third gear set, the third gear of the fourth gear set and the third gear of the fifth gear set are each selectively connectable for common rotation with the second countershaft;

a third countershaft rotatably supported within the transmission housing and spaced apart from and parallel with the first and second transmission input members, wherein the fourth gear of the second gear set is selectively connectable for common rotation with the third countershaft;

a first countershaft transfer gear rotatable fixed to the first countershaft for common rotation with the first countershaft;

a second countershaft transfer gear rotatable fixed to the second countershaft for common rotation with the second countershaft;

a third countershaft transfer gear rotatable fixed to the third countershaft for common rotation with the third countershaft wherein the first, second and third countershaft transfer gears transfer torque to a transmission output member;

seven synchronizer assemblies for selectively coupling at least one of gears of the five gear sets with at least one of the first, second and third countershafts, and wherein the selective engagement of the first and second clutches of the dual clutch assembly interconnects the dual clutch housing with at least one of the first and the second transmission input members and the selective engagement of at least one of the seven synchronizer assemblies establishes at least one of a plurality of forward and reverse speed ratios.

\* \* \* \* \*